(12) United States Patent
Suzuki

(10) Patent No.: US 7,825,339 B2
(45) Date of Patent: Nov. 2, 2010

(54) PROTECTOR

(75) Inventor: Takashi Suzuki, Yokkaichi (JP)

(73) Assignee: Sumitomo Wiring Systems, Ltd, Mie (JP)

( * ) Notice: Subject to any disclaimer, the term of this patent is extended or adjusted under 35 U.S.C. 154(b) by 27 days.

(21) Appl. No.: 12/439,310

(22) PCT Filed: Mar. 7, 2007

(86) PCT No.: PCT/JP2007/054389

§ 371 (c)(1),
(2), (4) Date: Feb. 27, 2009

(87) PCT Pub. No.: WO2008/041377

PCT Pub. Date: Apr. 10, 2008

(65) Prior Publication Data

US 2009/0211781 A1   Aug. 27, 2009

(30) Foreign Application Priority Data

Sep. 29, 2006 (JP) .............................. 2006-268627

(51) Int. Cl.
*H02G 3/04* (2006.01)
(52) U.S. Cl. ..................................................... 174/101
(58) Field of Classification Search .................. 174/19, 174/92, 97, 101
See application file for complete search history.

(56) References Cited

U.S. PATENT DOCUMENTS 2,087,640 A * 7/1937 Du Prey ...................... 174/101
4,864,082 A 9/1989 Ono et al.
2005/0106934 A1 5/2005 Hatori
2005/0133247 A1 6/2005 Hatori

FOREIGN PATENT DOCUMENTS

| JP | 63-198324 | 12/1988 |
|----|-----------|---------|
| JP | 64-81610  | 3/1989  |
| JP | 8-51714   | 2/1996  |
| JP | 11-299045 | 10/1999 |

OTHER PUBLICATIONS

English language Abstract of JP 11-299045, Oct. 29, 1999.
English language Abstract of JP 64-81610, Mar. 27, 1989.
English language Abstract of JP 8-51714, Feb. 20, 1996.
U.S. Appl. No. 12/439,248 to Suzuki, filed Feb. 27, 2009.

* cited by examiner

*Primary Examiner*—Chau N Nguyen
(74) *Attorney, Agent, or Firm*—Greenblum & Bernstein P.L.C.

(57) ABSTRACT

A protector main body including a bottom wall and both side walls and having an upper surface opening, is provided with an electric wire holder on a lower portion side of a bent portion, the electric wire holder projecting from a first side wall of the side walls and laid and locked to a second side wall of the side walls. The protector main body is also provided with taping tabs on both end portions in a length direction of the bottom wall. An electric wire bundle inserted through the protector main body is taped and fixed to the taping tabs, and pressed by the electric wire holder on the lower portion side of the bent portion, so as to prevent the electric wire bundle from projecting from the both side walls. In this state, the lid is covered on locked to the upper surface opening of the protector main body.

3 Claims, 5 Drawing Sheets

PRIOR ART

PROTECTOR

BACKGROUND OF THE INVENTION

1. Field of the Invention

The present invention relates to a protector mounted on an electric wire bundle routed in a vehicle, particularly to a three-dimensional protector including a bent portion, the protector preventing an electric wire bundle from projecting from a protector main body and thus enabling easy installation.

2. Description of Related Art

A resin protector is mounted on a wire harness routed in a vehicle in a location that requires electric wire protection and routing direction control. Numerous protectors of this type have conventionally been proposed. A protector 1, as shown in FIG. 6, is disclosed in Japanese Patent Laid-open Publication No. H8-51714.

The protector 1 vertically bends and holds a wire harness. A main body 2 having a long square tub shape through which the wire harness is inserted connects a lower layer portion 4 and an upper layer portion 5 via a vertically bent portion 3. A lid 7 is openably and closably connected to the main body 2 via a hinge 6 at an upper end of one side wall of the lower layer portion 4, the lid 7 covering an entire surface of an upper surface opening of the main body 2. The lid 7 and the main body 2 are locked via a locking hook 8a and a locking hook engaging frame 8b. In addition, the protector 1 may be locked by covering the lid 7, which is a separate body, on the main body 2 including the vertically bent portion 3, as shown in FIGS. 7A and 7B.

When a wire harness is inserted through the protector 1 having the structure above, the wire harness W is difficult to be fitted along a step shape from the lower layer portion 4 to the bent portion 3 in particular, as shown in FIG. 7A, and thus tends to be loose. Thus, a problem arises that, when the lid 7 is covered, the electric wires W come out, as shown in FIG. 7B. In order to prevent the problem, a worker needs to cover the lid 7 using one hand, and tuck in the electric wires W using the other hand, when locking the lid 7 and the main body 2. Particularly with the lengthy protector 1 as shown in FIGS. 7A and 7B, even when the electric wires W are tucked in one location, the wires may come out in another location. It is thus difficult to tuck the whole electric wires W in the protector main body 2 using one hand for the entire length, thus reducing workability.

Related Art 1: Japanese Patent Laid-open Publication No. H8-51714

SUMMARY OF THE INVENTION

The present invention is provided to address the above-described problems. The present invention is intended to provide a three-dimensional protector including a bent portion, the protector preventing an electric wire from projecting and thus increasing workability in fitting a protector main body and a lid.

In order to solve the above-described problems, the present invention provides a protector for a wire harness routed in an engine room of a vehicle. The protector is provided with a protector main body including a bottom wall and both side walls, the protector main body having an upper surface opening; and a lid covered on and locked to the upper surface opening after an electric wire bundle is inserted through the protector main body. The protector main body and the lid are resin molded parts. The protector main body is provided with a bent portion in a middle portion in a length direction, the bent portion being provided obliquely between a horizontal lower layer portion and upper layer portion; and the lid fitting the shape of the protector main body is bent three-dimensionally so as to have a bent portion. The protector main body is provided with an electric wire holder on the lower layer portion on the bent portion side, the electric wire holder being projected from a first side wall of the side walls and laid and locked to a second side wall of the side walls; and a locking hook provided at an end portion of the electric wire holder is locked into an electric wire holder locking frame provided on an external surface of an upper end portion of the second side wall of the side walls. The electric wire holder is merely bridged over the upper surface opening of the protector main body; and the electric wire holder is provided thinner than other portions of the protector main body, such that the lid is not internally pushed up. One of locking positions of the lid and the protector main body is provided proximate to a locking position of the electric wire holder and the second side wall of the side walls; and the lid is covered on an entire surface of the upper surface opening of the protector main body. The protector main body is provided with taping tabs on both end portions in the length direction of the bottom wall; the electric wire bundle inserted through the protector main body is taped and fixed to the taping tabs, and pressed by the electric wire holder on the lower portion side of the bent portion, so as to prevent electric wires from projecting from the both side walls. In this state, the lid is covered on and locked to the upper surface opening of the protector main body.

According to the protector of the present invention, before the lid is covered on the protector main body, the electric wire bundle is pressed by the electric wire holder on the lower portion side of the bent portion, which is a substantially middle portion in the length direction of the protector main body and in which the electric wire bundle is most likely loose. Thereby, the electric wires are set in the protector main body for the entire length of the protector and prevented from projecting therefrom. In addition, the small electric wire holder allows a worker to easily place the whole electric wires under the electric wire holder with one hand, while holding the electric wire holder with the other hand. Thus, even the three-dimensional protector including the bent portion enables the lid to be covered in a state where the electric wires do not project from the protector main body. Thereby, difficult work to tuck in the electric wires is eliminated, and thus fitting workability can be improved.

The lower portion side of the bent portion where the electric wire holder is provided refers to a boundary portion and a vicinity thereof between the bent portion and the lower layer portion extending from the bent portion. The lower portion side may be located in the bent portion proximate to the lower layer portion, or in the lower layer portion proximate to the bent portion.

The electric wire holder may have a linear or bent shape. For instance, when a central portion of the electric wire holder is projected toward the boundary portion side, the electric wire holder can more effectively hold the electric wires in the bent portion. Further, the electric wire holder may have a cross-sectionally semi-annular lower surface having a bulging arcuate shape, so as to prevent an edge of the electric wire holder from being contacted with the electric wire bundle when the electric wire holder is contacted therewith. In addition, it is preferable that the electric wire holder be provided along an inner surface of the lid, such that the lid is prevented from being pushed up internally by the thin electric wire holder. Thereby, the electric wire holder is prevented from interfering with fitting of the lid and the protector main body, thus allowing the lid and the protector main body to retain the fitting force.

The protector is for a wire harness routed in an engine room of a vehicle. Since a battery is disposed above the protector, and other members are disposed on both sides, an entire surface of the upper surface opening of the protector main body is covered by the lid.

According to the protector of the present invention, the electric wire bundle is pressed by the electric wire holder on the lower portion side of the bent portion, in which the electric wire bundle is most likely loose, as described above. Thus, even the three-dimensional shape protector including the bent portion allows the electric wire bundle to be set easily in the protector main body for the entire length. The lid can thus be covered in a state where the electric wires do not project from the protector main body, and thereby workability in fitting the main body and the lid can be improved.

In addition, since the electric wire holder has a thin shape and is provided along the inner surface of the lid, the electric wire holder is prevented from pushing up the lid, thus allowing the lid and the main body to retain the fitting force.

10 Protector
11 Protector main body
12 Lid
15 Bent portion
18 Taping tab
20 Electric wire holder
W Electric wire bundle

DETAILED DESCRIPTION OF PREFERRED EMBODIMENTS

The embodiment of the present invention is explained below with reference to the drawings. A protector 10 according to a first embodiment of the present invention is shown in FIGS. 1 to 4.

The protector 10 is mounted on an electric wire bundle W routed in an engine room of a vehicle. The protector 10 is placed in a narrow space surrounded by a battery above, other members on both sides, and a vehicle body below. In order to fit to the shape of the placement space, the protector 10 has a three-dimensionally bent shape.

Figure 1:
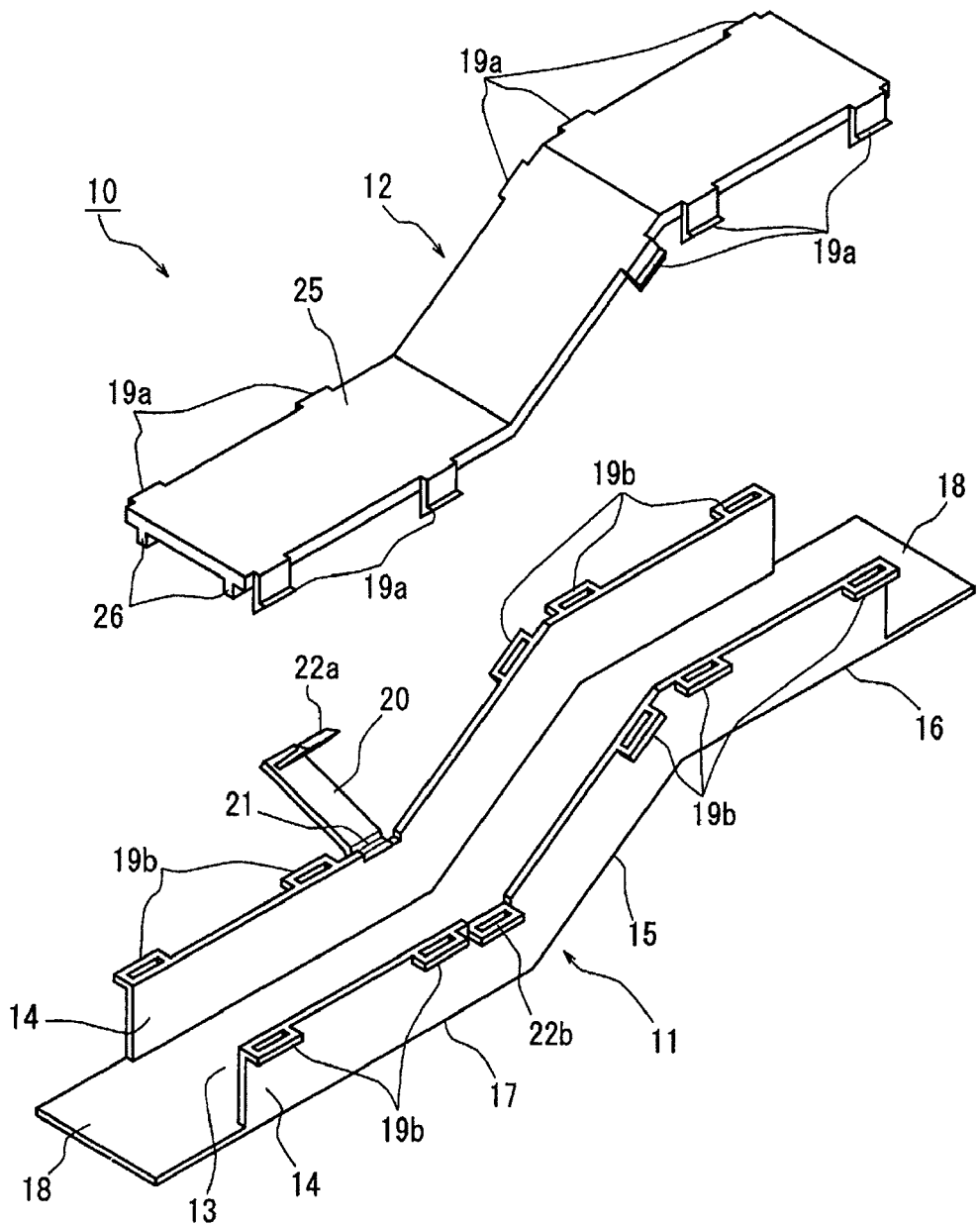
FIG. 1 is an exploded perspective view of a protector according to a first embodiment of the present invention.

As shown in FIG. 1, the protector 10 includes a protector main body 11 and a lid 12 as separate bodies, the protector main body 11 having an upper surface opening through which the electric wire bundle W is inserted, the lid 12 covering the upper surface opening of the protector main body 11 and locking thereinto.

The protector main body 11 has a tub shape formed by a bottom wall 13 and side walls 14 standing from both side ends in a width direction of the bottom wall 13. The protector main body 11 is formed from resin and integrally molded. Specifically, the protector main body 11 includes a vertically bent portion 15 in a middle portion in a length direction, a horizontal upper layer portion 16 extending to an upper side from the vertically bent portion 15, and a horizontal lower layer portion 17 extending to a lower side therefrom. The bottom wall 13 is projected on both end portions in the length direction, and thus taping tabs 18 are provided. Further, an electric wire holder 20 is bendably projected, via a hinge 21, from an upper end on a first side wall of the side walls of the lower layer portion 17 on the bent portion 15 side.

The electric wire holder 20 has a length laid to an upper end of a second side wall of the side walls of the lower layer portion 17, and has a narrow width. The electric wire holder 20 is formed thinner than other portions of the protector main body 11, and is provided with a locking hook 22a projecting from an end portion.

Lid locking frames 19b are projected at a plurality of locations on external surfaces of the both side walls 14 of the protector main body 11. An electric wire holder locking frame 22b is also projected from the external surface of the side wall at a location opposing the hinge 21 of the lower layer portion 17. At least one pair of the lid locking frames 19b is provided proximate to the hinge 21 and the electric wire holder locking frame 22b.

The lid 12 includes an upper wall 25 and reinforcing frames 26, which are integrally formed from resin. The three-dimensional upper wall 25 closes an entire surface of the upper surface opening of the protector main body 11. The reinforcing frames 26 are projected from inside in both side end portions in a width direction of the upper wall 25, and are contacted with inner surfaces of the both side walls 14 of the protector main body 11 when the lid 12 is fitted thereto.

Figure 2:
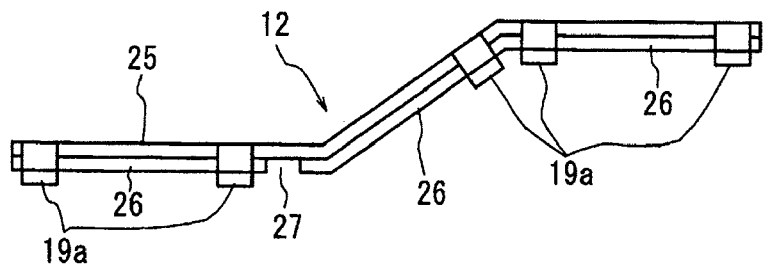
FIG. 2 is a side view of a lid.
Figure 3:
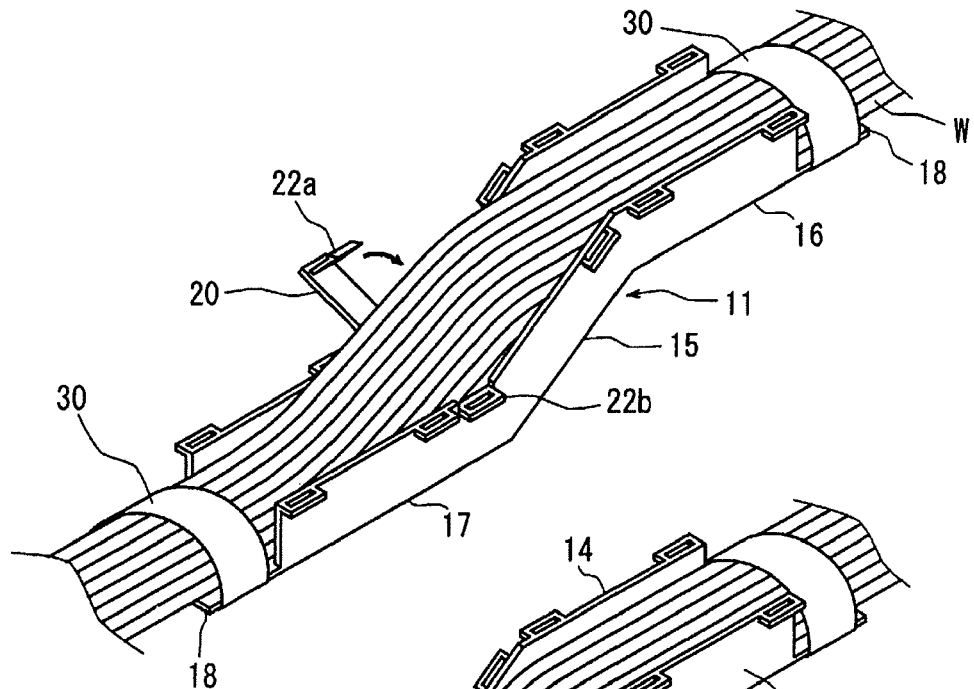
FIGS. 3A to 3C illustrate a process of mounting the protector on a wire harness.
Figure 3:
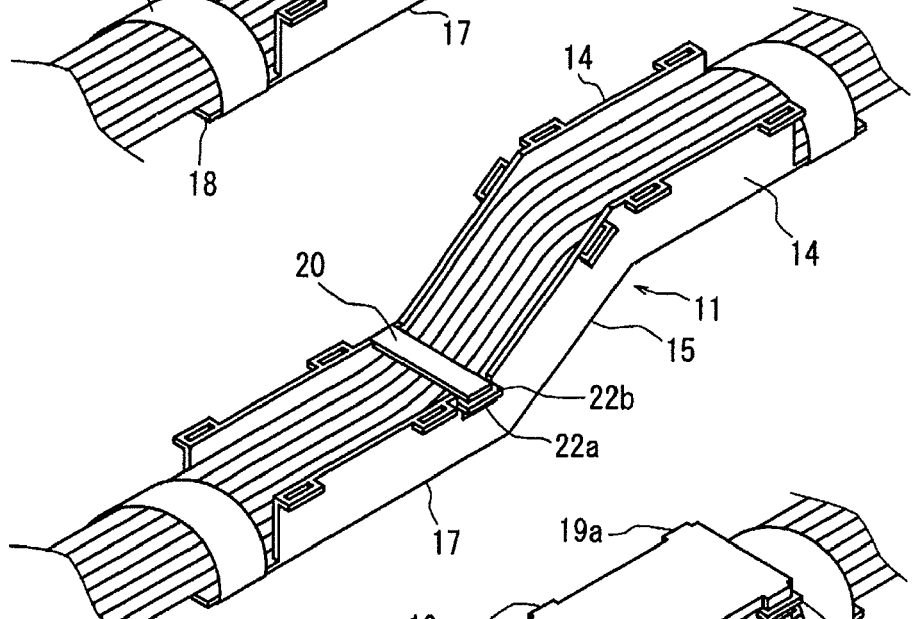
Figure 3:
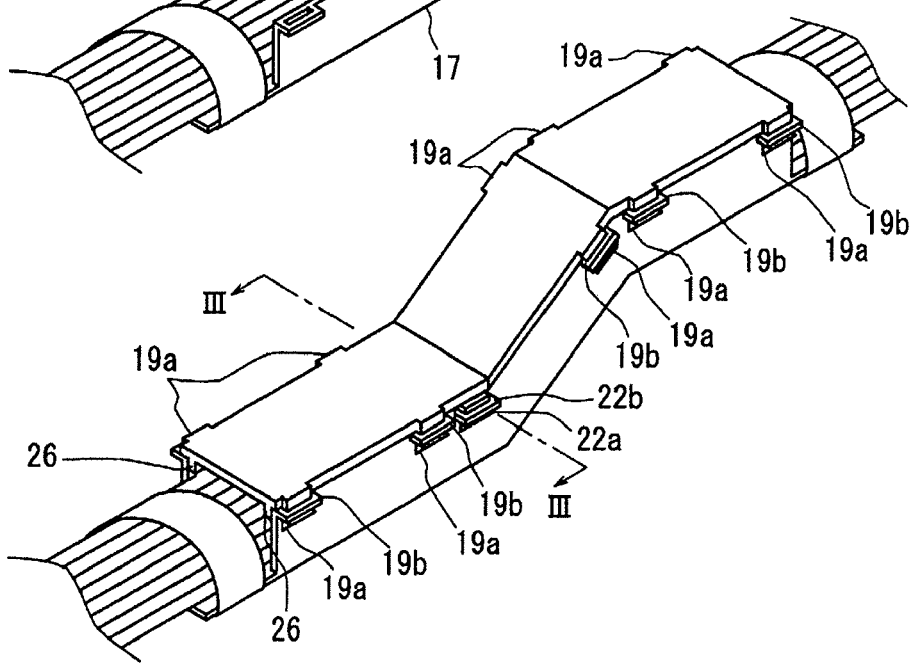

Locking hooks 19a are provided on both side ends in the width direction of the upper wall 25 of the lid 12. The locking hooks 19a are projected downward at locations corresponding to the lid locking frames 19b of the protector main body 11. The reinforcing frames 26 are continuously provided for an entire length in the length direction of the lid 12. A cutoff 27 is provided at a location, however, where the electric wire holder 20 of the protector main body 11 is laid, as shown in FIG. 2.

Procedures for mounting the protector 10 on the electric wire bundle W are explained below. As shown in FIG. 3A, the electric wire bundle W is first inserted through the protector main body 11 while the electric wire holder 20 is opened. Then, the electric wire bundle W is taped to the taping tabs 18 at the both front and rear end portions with a tape 30, and thus the electric wire bundle W is positioned and fixed. Thereafter, a worker bends the electric wire holder 20 using one hand to bridge over the protector main body 11, and places the electric wire bundle W under the electric bundle holder 20 using the other hand to set the electric wire bundle W in the main body 11. In this state, the locking hook 22a at the end portion of the electric wire holder 20 is engaged with and locked into the electric wire holder locking frame 22b of the protector main body 11, as shown in FIG. 3B. Lastly, the lid 12 is covered on the upper surface opening of the protector main body 11, as shown in FIG. 3C, and the locking hooks 19a of the lid 12 are engaged with and locked into the lid locking frames 19b of the protector main body 11.

According to the protector 10 of the present invention, the electric wire holder 20 provided on the lower layer portion 17 on the bent portion 15 side presses the electric wire bundle W, which tends to be loose in a portion from the lower layer portion 17 to the bent portion 15 of the protector main body 11. Thereby, the loose electric wire bundle W inclined to project from the both side walls 14 can easily be set in the protector main body 11 for the entire length. Consequently, work to tuck in the electric wires is no longer required when the lid 12 is fitted, thus improving lid fitting workability.

Figure 4:
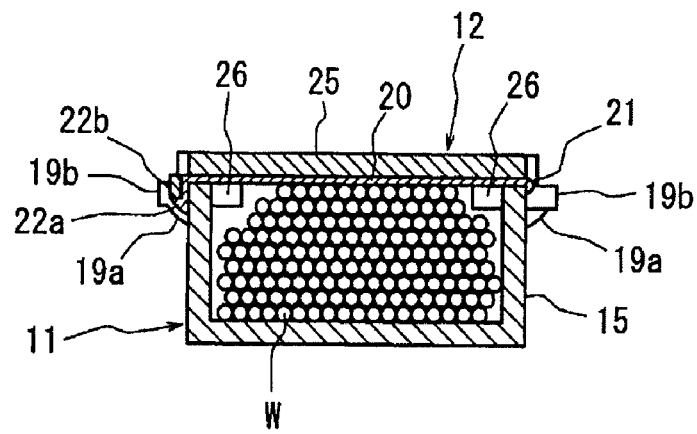
FIG. 4 is a cross-sectional view along line III-III of FIG. 3C.

Further, the electric wire holder 20 is formed thin and provided such that the holder is positioned along the inner surface of the lid 12, as shown in FIG. 4. Thereby, the lid 12 is not internally pressed up by the electric wire holder 20, and thus the locking hooks 19a can be inserted into and engaged with the lid locking frames 19b of the protector main body 11.

Furthermore, a locking portion of the lid 12 and the protector main body 11 is provided proximate to the locking position of the electric wire holder 20. The structure also prevents the lid 12 from being lifted by the electric wire holder 20.

Figure 5:
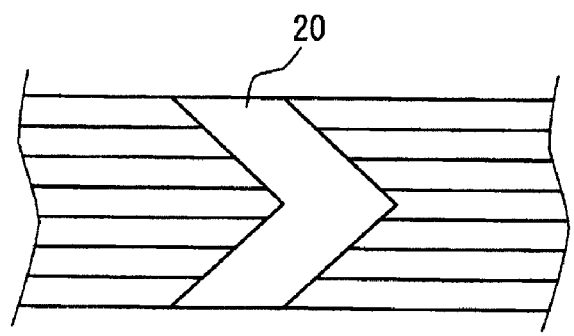
FIGS. 5A and 5B illustrate modification examples of an electric wire holder.
Figure 5:
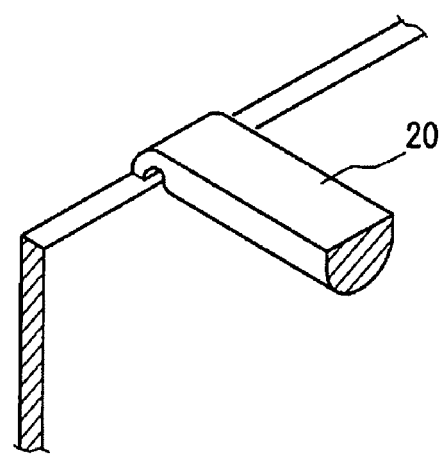
Figure 6:
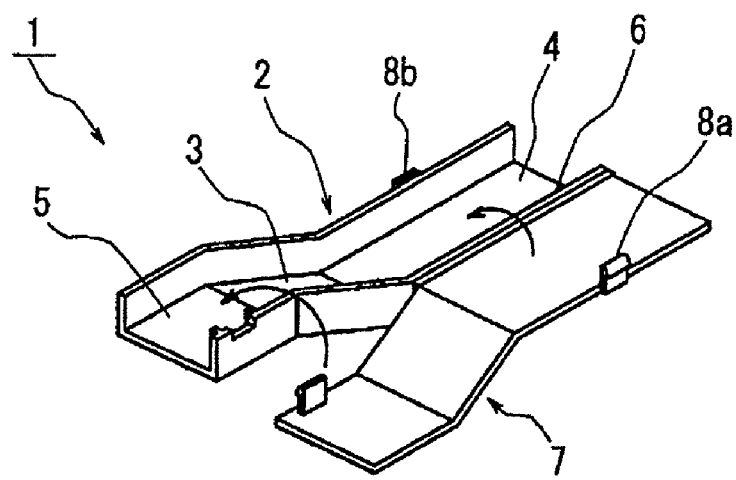
FIG. 6 illustrates a conventional example.
Figure 7:
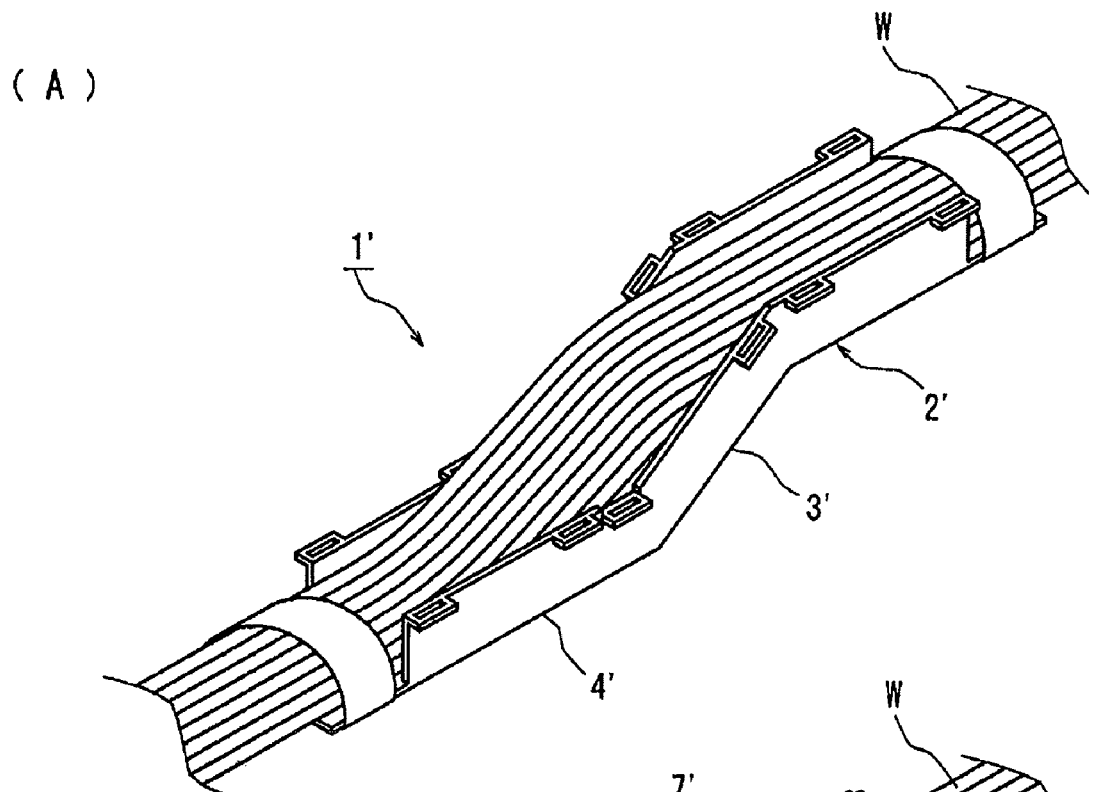
FIGS. 7A and 7B illustrate problems with the conventional example.
Figure 7:
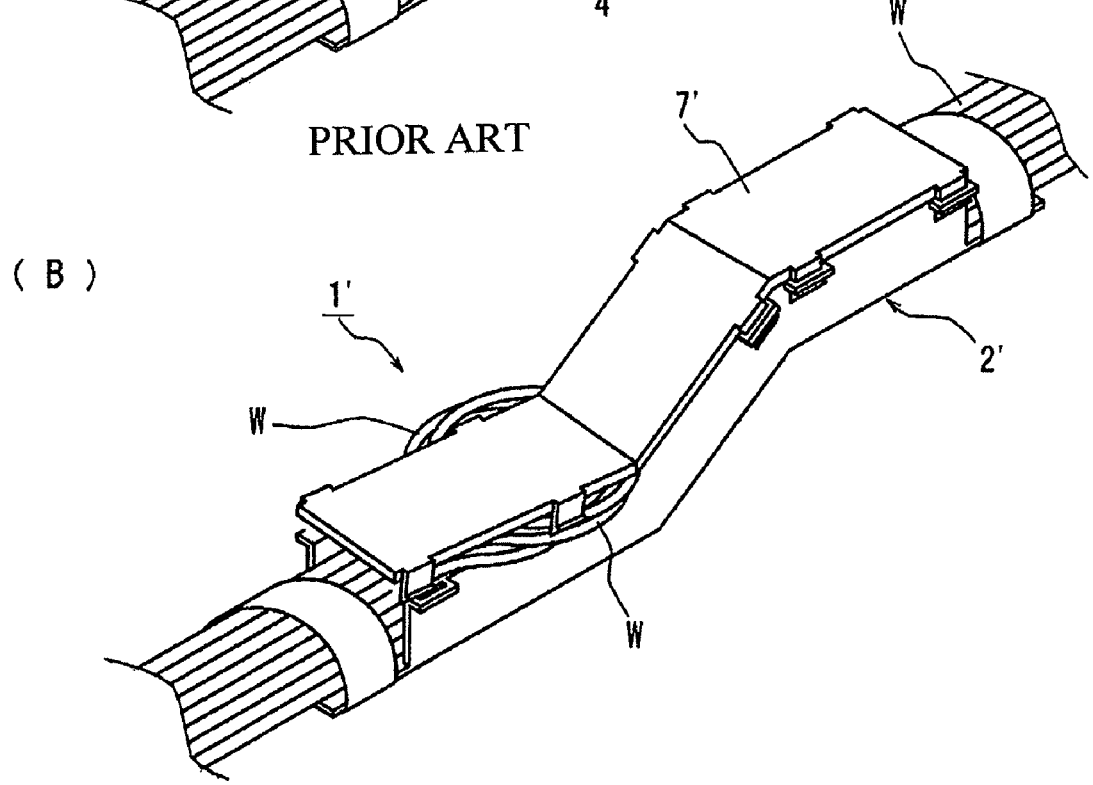

The present invention is not limited to the above-described embodiment. As shown in FIG. 5A, the electric wire holder 20 may be bent so as to have a V shape from a plan view and project a central portion toward the boundary portion side. The structure further ensures that the electric wire bundle is wired along a step of a bottom surface 11 of the protector main body. In addition, the electric wire holder 20 may have a semi-annular shape from a cross-sectional view having an arcuate lower surface, as shown in FIG. 5B. The shape allows the arcuate surface to contact the electric wire bundle and prevents an edge of the electric wire holder 20 from contacting the electric wire bundle, and thus surely prevents possible damage to an insulated surface of the electric wires.

What is claimed is:

1. A protector for a wire harness routed in an engine room of a vehicle, the protector comprising:
   a protector main body comprising a bottom wall and both side walls, the protector main body having an upper surface opening; and
   a lid covered on and locked to the upper surface opening after an electric wire bundle is inserted through the protector main body; wherein
   the protector main body and the lid are resin molded parts;
   the protector main body is provided with a bent portion in a middle portion in a length direction, the bent portion being provided obliquely between a horizontal lower layer portion and upper layer portion; and the lid fitting the shape of the protector main body is bent three-dimensionally so as to have a bent portion;
   the protector main body is provided with an electric wire holder on the lower portion on the bent portion side, the electric wire holder being projected from a first side wall of the side walls and laid and locked to a second side wall of the side walls; and a locking hook provided at an end portion of the electric wire holder is locked into an electric wire holder locking frame provided on an external surface of an upper end portion of the second side wall of the side walls;
   the electric wire holder is merely bridged over the upper surface opening of the protector main body; and the electric wire holder is provided thinner than other portions of the protector main body, such that the lid is not internally pushed up;
   one of locking positions of the lid and the protector main body is provided proximate to a locking position of the electric wire holder and the second side wall of the side walls; and the lid is covered on an entire surface of the upper surface opening of the protector main body; and
   the protector main body is provided with taping tabs on both end portions in the length direction of the bottom wall; the electric wire bundle inserted through the protector main body is taped and fixed to the taping tabs, and pressed by the electric wire holder on the lower portion side of the bent portion, so as to prevent electric wires from projecting from the both side walls; and, in this state, the lid is covered on and locked to the upper surface opening of the protector main body.

2. The protector according to claim 1, wherein the electric wire holder is bent so as to have a V shape from a plan view and project a central portion toward a boundary portion side of the lower layer portion and the bent portion.

3. The protector according to claim 1, wherein the electric wire holder has a semi-annular shape from a cross-sectional view having an arcuate lower surface.

* * * * *